US012712809B2

(12) United States Patent
Bouvet

(10) Patent No.: US 12,712,809 B2
(45) Date of Patent: Aug. 18, 2026

(54) GATEWAY AND METHOD FOR DIFFERENTIATING TRAFFIC TRANSMITTED BY THE GATEWAY, TRAFFIC MANAGEMENT DEVICE AND METHOD

(71) Applicant: Orange, Issy-les-Moulineaux (FR)

(72) Inventor: Bertrand Bouvet, Chåtillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 50 days.

(21) Appl. No.: 17/598,774

(22) PCT Filed: Mar. 20, 2020

(86) PCT No.: PCT/FR2020/050608
§ 371 (c)(1),
(2) Date: Sep. 27, 2021

(87) PCT Pub. No.: WO2020/193924
PCT Pub. Date: Oct. 1, 2020

(65) Prior Publication Data

US 2022/0166714 A1 May 26, 2022

(30) Foreign Application Priority Data

Mar. 28, 2019 (FR) ....................................... 1903264

(51) Int. Cl.
*H04L 45/74* (2022.01)

(52) U.S. Cl.
CPC .................................... *H04L 45/74* (2013.01)

(58) Field of Classification Search
CPC .... H04L 12/4633; H04L 45/74; H04L 69/167
See application file for complete search history.

(56) References Cited

U.S. PATENT DOCUMENTS

| | | | |
|---|---|---|---|
| 7,391,768 B1 * | 6/2008 | Samprathi | H04L 61/2585 709/219 |
| 2004/0125797 A1 * | 7/2004 | Raisanen | H04L 63/1466 370/392 |
| 2007/0168499 A1 * | 7/2007 | Chu | H04L 63/20 709/224 |

(Continued)

FOREIGN PATENT DOCUMENTS

| | | |
|---|---|---|
| EP | 1420559 A1 | 5/2004 |
| FR | 2898003 A1 | 8/2007 |
| WO | WO 2010072953 A1 | 7/2010 |

OTHER PUBLICATIONS

International Search Report and Written Opinion dated Jul. 13, 2020 for Application No. PCT/FR2020/050608.

*Primary Examiner* — Mansour Oveissi
(74) *Attorney, Agent, or Firm* — Knobbe, Martens, Olson & Bear, LLP

(57) ABSTRACT

A method for differentiating traffic is described. The method is implemented by a gateway between a first and a second network, and comprises inserting a piece of marking information into a label field of a packet transmitted by this gateway and intended to be routed to the second network in order to differentiate whether the packet has been generated by the gateway, or whether the packet has been generated by a terminal of the first network connected to the gateway, and sending the packet to the second network.

15 Claims, 4 Drawing Sheets

(56) References Cited

U.S. PATENT DOCUMENTS

2013/0212299 A1* 8/2013 Grundemann ...... H04L 61/2546
709/245
2015/0334591 A1* 11/2015 Keshavdas ............. H04W 4/18
370/236
2016/0029384 A1* 1/2016 Sidhu ................ H04W 72/0453
370/329
2017/0359317 A1* 12/2017 Anderson ............ G06F 21/602
2019/0268266 A1* 8/2019 Mathison ................ H04L 45/74

* cited by examiner

[Fig. 1]
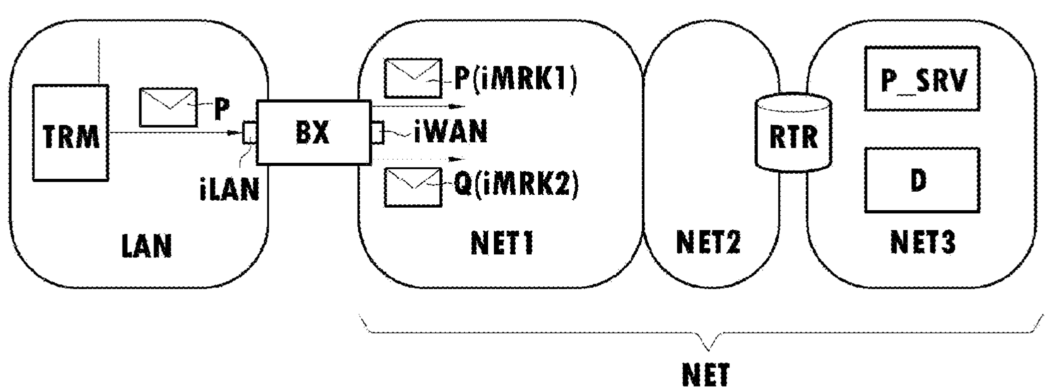

[Fig. 2]
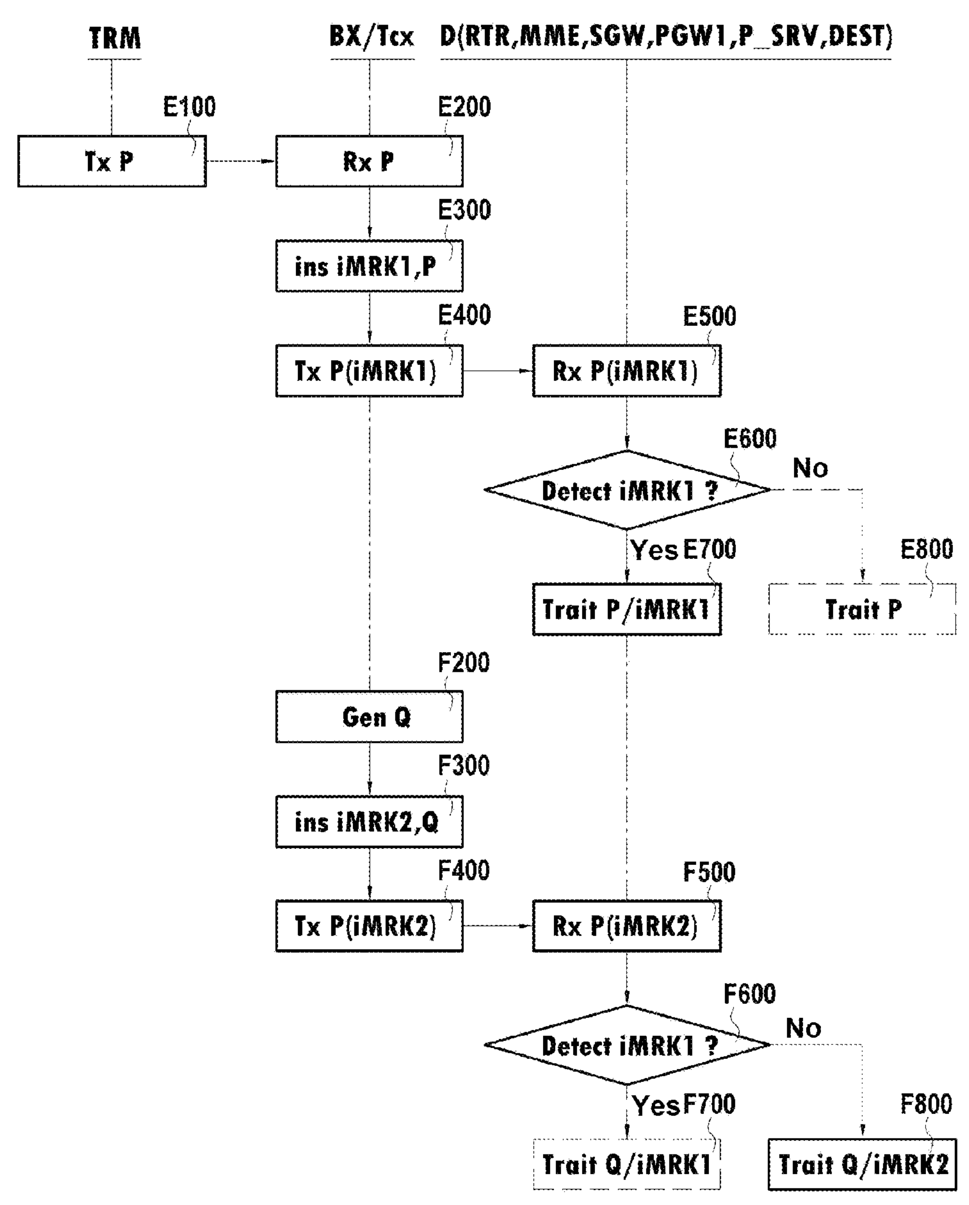

[Fig. 3]
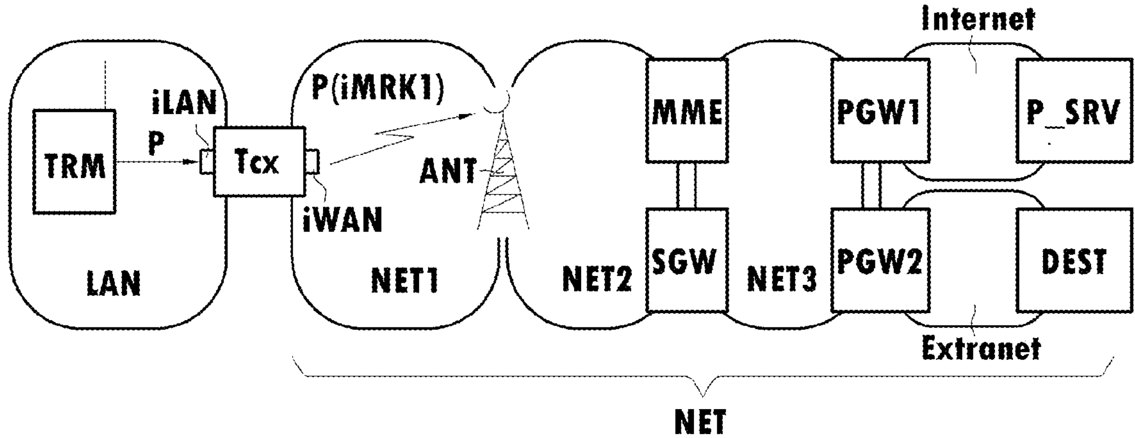
[Fig. 4]
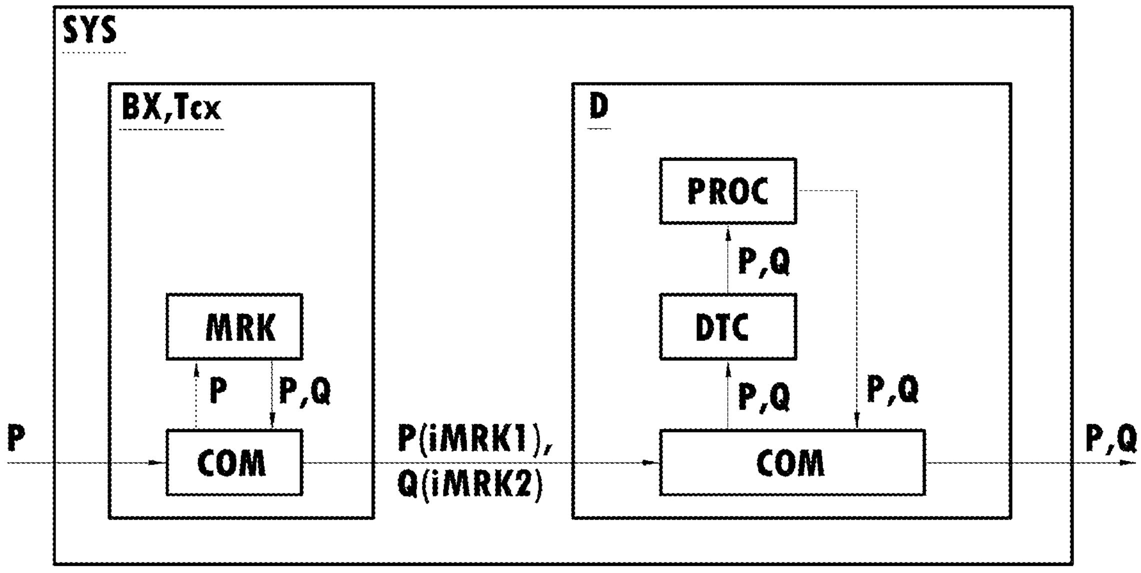

[Fig. 5]
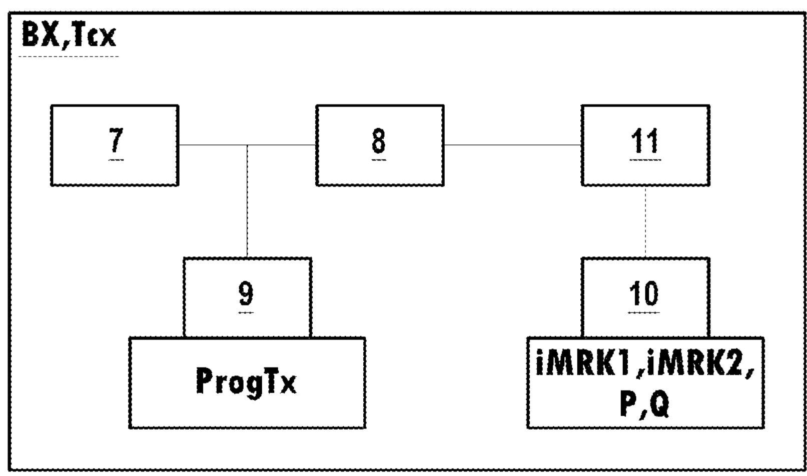
[Fig. 6]
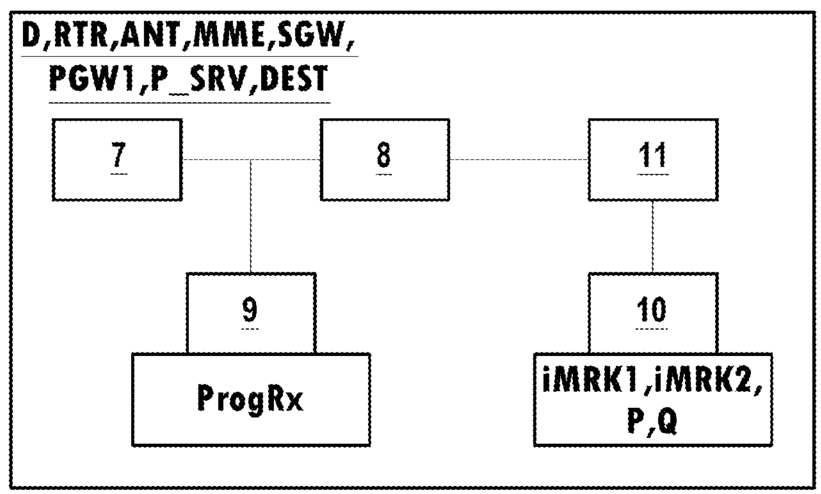

GATEWAY AND METHOD FOR DIFFERENTIATING TRAFFIC TRANSMITTED BY THE GATEWAY, TRAFFIC MANAGEMENT DEVICE AND METHOD

RELATED APPLICATIONS

This application is the U.S. National Phase of Application No. PCT/FR2020/050608 entitled "GATEWAY AND METHOD FOR DIFFERENTIATING TRAFFIC TRANSMITTED BY THE GATEWAY, TRAFFIC MANAGEMENT DEVICE AND METHOD" and filed Mar. 20, 2020, which claims the benefit of French Patent Application No. 1903264, filed Mar. 28, 2019, each of which is incorporated by reference in its entirety.

PRIOR ART

The invention relates to the general field of telecommunications. It concerns more particularly the field of traffic management emitted by a gateway between two networks.

A gateway between a first network and a second network ensures a function of interface between these two networks. Particularly, when the first network is a local network, and the second network is a network for accessing a network of an operator, the gateway routes packets emitted by terminals of the local network to the access network, and packets received from the access network and intended for these terminals.

The gateway has a first IP address which identifies it in the first network (the local network in this example) and at least a second IP address which identifies it in the second network (the access network). Particularly, the gateway can have several second IP addresses when it includes several interfaces for connection to the second network.

In the case of IPv4-type packet addressing, the gateway implements a NAPT (Network Address Port Translation) method.

When the gateway receives from a terminal of the local network a packet intended to be routed to the access network, the gateway creates a new entry in its NAPT table (in case this NAPT entry does not already exist) by saving the source IP address of the packet (the address of the terminal in the local network), the source port number selected by the application of the terminal that has generated the packet, the destination IP address of the packet, the destination port number, an identifier of the communication protocol used for this packet such as the TCP protocol or the UDP protocol, and possibly a source port number modified by the gateway. This NAPT entry allows storing the fact that this packet has been generated by the terminal and routing a possible packet of response thereto to the terminal. The gateway then modifies the header of this packet by replacing the source IP address of the terminal with its own IP address on the access network. Having modified the header of the packet, the gateway recalculates the checksum of the packet using its NAPT function before sending the packet to its destination via the access network.

Viewed from the recipient, this packet comes from the gateway because its source IP address is that of the gateway on the access network. A packet of response to this packet will have this IP address of the gateway on the access network as the destination IP address.

Upon receipt of the response packet, the gateway consults its NAPT table, determines that this response packet is intended for the terminal of the local network, and modifies its header by replacing the destination IP address with the IP address of the terminal in the local network, and potentially the destination port number in case the gateway modified the source port number when sending the packet to the access network. Likewise, the gateway, and more specifically its NAPT function, recalculates the checksum of the response packet before transmitting it to the terminal.

In the case of IPv6-type packet addressing, the IP address of the gateway on the access network and the IP address of the terminal have the same IPv6 prefix because they correspond to the same network. In particular, the IPv6 prefix of the terminal can be assigned to the terminal by the gateway, the complement of the IPv6 address of the terminal being self-generated by the concatenation of the identifier of the network interface of the terminal.

When the gateway receives from the terminal an IPv6 packet to be transmitted to a recipient via the access network, the gateway verifies whether this access network supports the IPv6 protocol. If so, the gateway decrements the value of the "Hop Limit" field in the header of the packet and transfers it to the access network.

If this is not the case, and provided that the gateway supports the two IPv4 and IPv6 protocols (operation in Dualstack mode), the gateway creates an IPv4 tunnel between itself and a CGN (Carrier Grade NAT) type network equipment to encapsulate IPV6 packets transmitted or received by the terminal in IPV4 packets. In this case, the CGN-type network equipment uses a NAPT table as described above.

The Applicant has detected that terminals of the local network connected to the gateway can experience fraudulent behaviors.

By way of example, a fraudulent user can generate, through his terminal connected to the gateway, VoIP (Voice over IP) calls, without going through the VoIP protocol stack of the gateway.

Particularly, the fraudulent user can use an automatic calling machine to generate several VoIP calls simultaneously.

Another example of fraud is that a terminal of the local network connects, via the gateway, to a server accessible through the access network and hacks sensitive information sent by this server to the gateway, such as signaling packets, characteristics of a firmware-type software, a VoIP configuration file, a service configuration web portal, etc. It would therefore be useful to detect the traffic emitted by the terminal even before reaching the server.

Another example of fraud can occur when the gateway is a terminal that has a Tethering-type function, allowing it to operate as a WiFi access point. Such an access point allows benefiting from a connection to an access network, for example a cellular access network, of the terminals connected thereto via the WiFi network and authenticated therewith. A terminal of a fraudulent user can connect to such a WiFi access point by defrauding the authentication step and connect to the access network under the identity (and in particular the consumption package) of the WiFi access point.

There is therefore a need for a solution that allows detecting the fraudulent behavior of terminals connected to the gateway.

DISCLOSURE OF THE INVENTION

The invention relates to a traffic differentiation method implemented by a gateway between a first network and a second network. The method comprises steps of:

inserting marking information in a field of the header of a packet emitted by the gateway and intended to be routed to the second network to differentiate whether:
the packet was generated by the gateway, or whether the packet was generated by a terminal of the first network connected to the gateway; and;
sending the packet to the second network.

Correspondingly, the invention aims a gateway between a first network and a second network, comprising:

a traffic differentiation module configured to insert marking information in a field of the header of a packet emitted by said gateway and intended to be routed to the second network to differentiate whether:
the packet was generated by the gateway, or whether the packet was generated by a terminal of the first network connected to the gateway; and
Communication means configured to send the packet to the second network.

The characteristics and advantages of the differentiation method according to the invention presented below apply in the same way to the gateway according to the invention and vice versa.

Correspondingly, the invention relates to a method for managing a traffic received by a device of a network including one said second network, the traffic being received from a gateway between a first network and said second network, the device being connected to the gateway via the second network, this method comprising steps of:

receiving a packet from the gateway;
searching for marking information in a field of the header of the packet, this marking information allowing differentiating whether:
the packet was generated by the gateway, or whether the packet was generated by a terminal of the first network connected to the gateway; and
processing the packet based on the result of the search.

Correspondingly, the invention aims a device of a network including one said second network, said device being connected, via the second network, to a gateway between a first network and the second network, and allowing managing a traffic received from the gateway, the device comprising:

communication means configured to receive a packet from the gateway;
searching means configured to search for at least one marking information in a field of the header of the packet, the marking information allowing differentiating whether:
the packet was generated by the gateway, or whether the packet was generated by a terminal of the first network connected to the gateway; and
a processing module configured to process the packet based on the result of the search.

The characteristics and advantages of the management method according to the invention presented below apply in the same way to the network device according to the invention and vice versa.

The characteristics and advantages of the differentiation method according to the invention presented below apply in the same way to the management method according to the invention and vice versa.

The gateway in accordance with the invention can implement the differentiation method in accordance with the invention. The device in accordance with the invention can implement the management method in accordance with the invention.

In accordance with the invention, the terminal of the first network connected to the gateway can be a mobile phone of the type smartphone, computer, tablet, connected object, or any other communicating device connected to the first network.

In one embodiment, the first network is a local network and the second network is an access network.

Within the meaning of the invention, the local network can be a home network, a university network, a company network or any other LAN (Local Access Network) type network managed by an administrative entity.

Within the meaning of the invention, the access network is a network allowing accessing a WAN (Wide Area Network) type network or a CAN (Centralized Area Network) type core network or a MAN (Metropolitan Area Network) type aggregation network. The access network is managed by an operator.

No limitation is imposed on communication technologies deployed by the local network or by the access network.

As an indication, the local network can be a wired, Ethernet, or fiber-optic network for example, or a wireless communication network, such as a Bluetooth network or a WiFi network.

As an indication, the access network can be a wired, ADSL or fiber-optic network for example, a wireless communication network, such as a WiFi network or a 3G, 4G or 5G type cellular network.

In another embodiment, the first network is an access network and the second network is an aggregation network MAN or a core network CAN.

The first network and the second network may be of the same technology or of different technologies.

The gateway acts as an interface between the first network and the second network, it is both a device of the first network and of the second network. The gateway allows routing packets from each of the networks to the other. It thus allows connecting terminals from the first network to the second network.

In accordance with the invention, the gateway allows routing packets from the terminals of the first network (local network for example) to the second network (access network for example). The gateway can also generate packets itself and send them to the second (access) network, such as signaling packets or packets for checking the connection of the first and second networks.

The marking information allows a device receiving the marked packet to distinguish whether this packet was generated by the gateway or generated by a terminal of the first network, the receiving device being a device in accordance with the invention. The invention therefore allows processing the packet based on its generator.

In general, the invention allows distinguishing the traffic at the second network.

The invention applies particularly in case of IPv4 addressing. Indeed, in IPv4, the packets emitted by the gateway have as source IP address the IP address of the gateway on the second network. The marking information allows a device receiving these packets to know whether these packets were generated by the gateway itself or generated by terminals of the first network and transferred by the gateway.

The invention also has an advantageous application in case of IPV6 addressing. Indeed, in IPv6, a packet emitted by a terminal of the first network has as source IP address the address of the terminal and not the address of the gateway. However, these two addresses, of the terminal and of the gateway, have the same IPv6 prefix and the security check by a recipient of this packet is currently done based on the prefix or on a network address or on a sub-network because it is difficult to check the identity of the equipment that has generated the packet by analyzing network interface information concatenated with the IPv6 prefix.

The invention presents a solution more reliable than a distinction of a generator from a packet on the basis of the source port of that packet. Indeed, this port can be modified by the gateway, and even if it is not modified, this port can be identical for the gateway and for the terminal, because it is related to an application: for example the UDP/TCP 5060 port corresponds to Voice over IP (VoIP) applications using SIP (Session Initiation Protocol) protocol.

The invention presents a more reliable solution than a distinction of a generator of a packet on the basis of a verification of header fields comprised in the packet and corresponding to an application layer (of the OSI model for example). By way of example, for the SIP protocol, the "User Agent" field of the SIP header is cited. This field represents a provider and/or the software version of the application that generated the packet. However, this field can be modified in the SIP stack of a VoIP terminal of a malicious user, for example by inserting the same value as the one inserted by the SIP stack of the gateway.

The invention presents a more reliable solution than a checking of the SIP headers highlighted with the source IP address and the port number used by the VoIP application of the terminal of the first network, such as the "Address of Contact" (AoC) SIP field or the "Via" SIP field. Indeed, a gateway implementing an ALG (Application Layer Gateway) function does not transfer this information outside the first network. Such a gateway systematically replaces at the SIP application level, for example for the "Contact Address" and "Via" fields, the IP address highlighted with the IP address of the terminal by its own second IP address.

In addition, the invention presents a less expensive solution in terms of memory and computing capacity compared to a distinction of a generator of a packet based on the "SIP User agent" field or on a SIP header "AoC" or "Via" because these methods would require setting up Header Manipulation Rules (HMR).

The invention therefore allows improving security at the network including the second network. Different methods for processing the packet can be applied to the packet depending on whether it was generated by the gateway or by the terminal of the first network.

The invention allows detecting possible fraudulent uses. For example, a VoIP service packet, that the device in accordance with the invention has determined as having been generated by the terminal, and which includes identifiers of the gateway at its SIP header, can be interpreted as a fraudulently generated packet.

In the description, when the gateway is said to "generate" a packet, it is meant that it generates it itself. In other words, it builds it and does not modify a packet received from a third party.

In one embodiment of the invention, the marking information inserted by the gateway is an indication that the marked packet was generated by the gateway. In this embodiment, the gateway does not insert any marking information in the headers of the packets generated by terminals of the first network and intended to be routed by the gateway to the second network.

In another embodiment, the gateway inserts marking information in the header of a packet only when this packet has been generated by a terminal of the first network.

In another embodiment, the gateway inserts a first marking information in a field of the headers of the packets it generates, and a second information in a field of the headers of the packets it has received from the terminals of the first network and that it transfers to the second network. Thus, upon receipt of a packet, the device in accordance with the invention can distinguish whether this packet was generated by the gateway or by a terminal connected to the gateway depending on whether it includes in its header the first or the second marking information.

In general, the gateway can be considered as a trusted device because it forms part of the second network. Characteristics identifying the gateway, such as its IP address, its location, or a subscription of connection of the gateway to the second network, can be more easily checked by the network including the second network, than characteristics of terminals of the first network. Under this consideration, the packets generated by the gateway are considered as being safer than the other packets generated by the terminal.

In one embodiment, the gateway in accordance with the invention is a network termination device; such equipment is often marketed in France under the name "box" and offers multiple services (telephony, Internet, television, etc.), such as LiveBox equipment (product marketed by Orange). In this embodiment, the first network is a local network, and the second network is an access network.

In this embodiment, it is preferable that the gateway inserts marking information only in the packets it generates. Indeed, the number of packets generated by network termination equipment is generally smaller than the number of packets transferred by this equipment and having been generated by terminals of the local network.

However, it should be noted that the insertion of the marking information in accordance with the invention is not detrimental in terms of time of preparation of the packet for its sending to the access network.

Indeed, if the packet is generated by the gateway, the latter can insert the marking information when inserting the other fields of the header.

On the contrary, if the packet is generated by a terminal of the local network, the gateway modifies the header of this packet anyway:

- an IPv4 header is manipulated for NAT (Network Address Translation) type functionalities, a replacement of an IP address, or a port or a re-calculation of checksum-type information;
- an IPv6 header is manipulated to modify the "Hop Limit" field.

In another embodiment, the gateway in accordance with the invention is a terminal able to provide a connection sharing service of the Tethering type. In this embodiment, the first network is a local network, and the second network is an access network. It is recalled that a terminal offering a Tethering service allows benefiting from its connection to a network for accessing another terminal connected to the first terminal via a local network, the local network generally being a WiFi network.

In this embodiment, it is preferable that the gateway inserts marking information only in the packets generated by terminals of the local network which are connected thereto and benefit from its Tethering service. Indeed, a gateway of this type, being itself a communication terminal, can generate as many, even more, packets than the other terminals of the local network.

Alternatively, a gateway of this type can insert in a field of the header of a packet, a first or a second marking information to differentiate which one generated the packet: the gateway or a terminal connected thereto.

In one embodiment, the gateway in accordance with the invention is a base station of a cellular network, such as a base station of the eNodeB or advanced eNodeB type. The application of the invention at the level of such a gateway allows optimizing the use of the radio resources of the cellular network as a function of the entity that generated the packet. As the radio resources are limited, a good quality of service must be privileged for the packets generated by the base station (signaling packets) over packets generated by terminals connected to the base station. In this embodiment, the first network is an access network, and the second network is an aggregation network or a core network.

In one embodiment, the device in accordance with the invention and allowing managing the traffic, is comprised in one of the following devices:

- the device recipient of the packet, this device can be a phone, a computer, a tablet, a SmartWatch, a connected vehicle or any other communication terminal;
- a network termination equipment, for example belonging to the same local network as the packet destination device;
- an access point of a cellular access network, for example an access point connected to the same access network as the gateway in accordance with the invention, or an access point connected to the same local network as the packet destination device;
- a router;
- a switch, indeed some level 2 switches of the OSI model have capacities to process level 3 information;
- a traffic load manager or traffic loader;
- a Firewall-type server;
- a device of the network including the second network, to which the device and the gateway in accordance with the invention are connected, such as a device of the A-SBC (Access Session Border Controller), P-CSCF (Proxy Call Session Control Function), MME (Mobility Management Entity), PGW (Packet data network Gateway), or SGW (Serving Gate Way) type; or
- a platform for providing a service (P_SRV).

It should be noted that searching for and obtaining the marking information by the device in accordance with the invention is not detrimental to the packet conveying latency because in any case, the IP headers are manipulated, for example to find a source or destination IP address, or a source or destination port number, or for a checksum consistency check of the packet, etc.

It should also be noted that the impact of the invention on the MTU (Maximum Transmission Unit) criteria is not detrimental. It is recalled that the MTU criteria are related to the maximum size of a packet that can be transmitted at one time on a network segment. Indeed, the marking information can consume a single bit to distinguish the packets generated by the gateway from the packets generated by terminals of the first network.

In the case where the packet is of the IPv4 type, the gateway can insert the marking information in the "Flags" field or the "IP options" field of the IPv4 header of the packet.

It is recalled that the "Flags" field is encoded on three bits and uses in the state of the art only the second and the third bit. Therefore, the first bit of this "Flags" field can be used by the present invention. For example, this first bit can be set to 1 for the packets generated by the gateway and set to 0 for the packets generated by terminals of the first network that are connected to the gateway. The size of the IP packet is not increased.

It is recalled that an IP option is encoded on 8 bits. It can be envisaged to create a new IP option, from one of the classes 0 to 3, to insert the marking information therein. The use of the "IP options" field consumes more memory than the use of the "Flags" field. Indeed, the use of the "IP options" field increases the size of the packet to a maximum of 4 bytes, even if an IP option is encoded on a single byte so as to preserve the alignment of the IP packets on a multiple of 32 bits.

The use of the "Flags" field is therefore preferable in terms of size of the packet and of search for marking information in the packet.

In the case where the packet is of the IPv6 type, the gateway can insert the marking information in the "flow label" or "extension header" field of the IPv6 header of the packet.

Thus, the invention is compatible with the IPv4 and IPv6 protocols, and can therefore be easily implemented by gateways and network devices currently available on the market with minor modifications to insert and search for the marking information.

The invention can be used to mark traffics of different applications, such as web browsing applications, mail applications, FTP (File Transport Protocol) applications, TV applications, VoD (Video on Demand) applications, VoIP (voice over IP) applications, signaling traffics generated by connected and/or autonomous vehicles, etc. Indeed, the marking information is inserted at the level of the IP headers and does not impact the data of these applications integrated into the bodies of the packets.

The invention is compatible with the MPTCP (Multi Path Transport Control Protocol) traffic aggregation protocol.

The invention may be compatible with the combinatorial tunnel mechanisms, allowing switching from one protocol among IPv4, IPv6 and GTP (GPRS Tunneling Protocol) to another.

The invention is also compatible with the securing mechanisms of the state of the art, such as the IPSec (Internet Protocol Security), sRTP (Secured Real Time Protocol), SIPS (Session Initiation Protocol Secured), HTTPS (Hyper Text Transfer Protocol Secured), and TLS (Transport Layer Security) protocols.

In one embodiment, the step of processing the packet of the management method in accordance with the invention includes an incrementation of a packet counter including marking information.

The invention allows performing statistics on the number or the percentage of the packets generated by the gateway or by the terminals connected to the gateway. These statistics can be utilized to dimension the access network, to anticipate changes in a network, to propose new functionalities of connection to a network, to adapt the quality of service offered by a network, and/or to establish billing policies.

In one embodiment, the processing of the packet by the device in accordance with the invention includes a deletion of the marking information before transfer of this packet to another device.

This embodiment is suitable for a local processing of the packets, at the device in accordance with the invention, without disclosing the marking information to the other devices through which the packet passes until it reaches its recipient device.

In one embodiment, the processing of the packet by the device in accordance with the invention includes a modification of the marking information before transfer of this packet to another device.

This embodiment can be implemented to ensure compatibility during a passage of the packet from one network to another, these two networks not using the same format of the marking information.

In one embodiment, the processing of the packet by the device in accordance with the invention includes a selection of a quality of service to be applied to the packet.

For example, the device in accordance with the invention can process the packets generated by the gateway in a privileged way over the packets generated by a terminal of the first network: by placing them in priority or shorter queues, or by transporting them on a communication channel with better performances (in terms of latency or signal-to-noise ratio for example), or routing them to faster routes, etc. Indeed, the packets generated by the gateway can include signaling packets.

In one embodiment, the processing step includes an IP DSCP (Differentiated Service Code Point) type marking. This embodiment allows notifying nodes placed downstream of the management device, of a priority level associated with the packet and/or of another processing to be applied to the packet.

In one embodiment, the processing step includes an application of a marking-based billing method.

In one embodiment, the processing of the packet by the device in accordance with the invention includes an application to the packet of a routing method.

The routing method may include a routing of the packets to different paths based on their marking information, for example to different connection interfaces of the device in accordance with the invention.

In one embodiment, the processing of the packet by the device in accordance with the invention includes a destruction of the packet.

This embodiment allows stopping the transfer of the packet if it has been determined that this packet is likely to be generated by a fraudulent user.

In one embodiment, the processing of the packet by the device in accordance with the invention includes a sending of an ICMP (Internet Control and Error Message Protocol) packet to the sender of the first packet to inform him of a reason for the denial of conveyance of this first packet.

In one embodiment, the processing of the packet by the device in accordance with the invention includes a creation of an IP tunnel to route the packet via this IP tunnel.

This embodiment allows routing the packet towards a specific destination, namely the other end of the IP tunnel, and applying to the packet a determined quality of service method corresponding to this IP tunnel.

In one embodiment, the processing of the packet by the device in accordance with the invention includes a de-encapsulation of an IP tunnel through which said packet is routed.

This embodiment allows applying to the packet a routing method and a quality of service application method other than the methods implemented for the IP tunnel.

In one embodiment, the processing of the packet by the device in accordance with the invention includes a storage of parameters of the session during which the packet is received, to apply a processing to other packets of the same session.

It is recalled that an IP session is based on a source IP address, an emission port, a destination IP address, a destination port and a transport protocol.

Particularly, the storage of session parameters allows identifying at least one response packet to the packet received by the device in accordance with the invention. This embodiment allows applying a processing specific to the response packets to marked packets. Particularly, the processing applied to the response packets may be identical to the processing of the packets received from the gateway.

Also, the storage of session parameters allows identifying other packets received from the gateway, of the same session as the processed packet. Indeed, once the IP session is established, when the device in accordance with the invention detects marking information on a first packet of the session, it can deduce that the packets of the same session are also generated by the same entity (the gateway or the same terminal of the first network). The gateway can then simply mark a single packet or some packets of this IP session, and not all the packets of the same session. The device in accordance with the invention can apply a specific processing to these packets of the same session, particularly a processing identical to the first processed packet of this session.

The invention aims a system for managing a traffic emitted by a gateway in accordance with the invention to the access network. This system includes the gateway and at least one device in accordance with the invention for managing the traffic.

The invention also aims a first computer program on a recording medium, this program being likely to be implemented in a computer or a gateway in accordance with the invention. This program includes instructions adapted to the implementation of a traffic differentiation method as described above.

The invention also aims a second computer program on a recording medium, this program being likely to be implemented in a computer or a traffic management device in accordance with the invention. This program includes instructions adapted to the implementation of a traffic management method as described above.

Each of these programs can use any programming language, and be in the form of source code, object code, or intermediate code between source code and object code, such as in a partially compiled form, or in any other desirable form.

The invention also aims an information medium or a recording medium readable by a computer, and including instructions of the first or of the second computer program as mentioned above.

The information or recording media can be any entity or device capable of storing the programs. For example, the media may include a storage means, such as a ROM, for example a CD ROM or a microelectronic circuit ROM, or a magnetic recording means, for example a floppy disk or a hard disk, or a flash memory.

On the other hand, the information or recording media can be transmissible media such as an electrical or optical signal, which can be conveyed via an electrical or optical cable, by radio link, by wireless optical link or by other means.

The programs according to the invention can be particularly downloaded over an Internet-type network.

Alternatively, each information or recording medium can be an integrated circuit in which a program is incorporated, the circuit being adapted to execute or to be used in the execution of a method in accordance with the invention.

BRIEF DESCRIPTION OF THE DRAWINGS

Other characteristics and advantages of the present invention will emerge from the description given below, with reference to the appended drawings which illustrate an exemplary embodiment thereof without any limitation. In the figures:

FIG. 1 illustrates a network architecture in which methods of the invention can be implemented according to a first embodiment of the invention;

FIG. 2 is a flowchart representing steps of a differentiation method and steps of a management method, the methods being in accordance with the invention and implemented according to the first embodiment;

FIG. 3 illustrates a network architecture in which methods of the invention can be implemented according to a second embodiment of the invention;

FIG. 4 shows functional architectures of a management system, of a gateway and of a traffic management device, in accordance with the invention;

FIG. 5 shows a hardware architecture of a gateway according to one embodiment of the invention; and FIG. 6 shows hardware architecture of a management device according to one embodiment of the invention.

DESCRIPTION OF EMBODIMENTS

FIG. 1 illustrates an architecture of a local area network LAN connected via a gateway BX to a network NET of an operator. A traffic differentiation method is implemented by the gateway BX, a traffic management method is implemented in the network NET, by a device D of this network NET. The gateway BX, the device D and the differentiation and management methods comply with a first embodiment of the invention.

In this embodiment, the network NET includes an access network NET1, a MAN-type metropolitan area network NET2 and a CAN-type core network NET3. These three networks NET1, NET2 and NET3 are managed by the same administrative entity, which is in this example a communication operator. In this embodiment, the access network NET1 is a fiber-optic network, however, no limitation is imposed on the technologies deployed in the networks NET1, NET2 and NET3.

In this embodiment, the local area network LAN constitutes a first network within the meaning of the invention. The access network NET1 constitutes a second network within the meaning of the invention.

In this embodiment, the gateway BX is a network termination equipment for connecting the local area network LAN to the access network NET1.

In this embodiment, the local area network LAN is a WiFi network. Alternatively, it can be an Ethernet network based on fiber, coaxial cable, Bluetooth, DECT (Digital Enhanced Cordless Telecommunications) or any other communication technology in a LAN-type network.

A terminal TRM is connected to the gateway BX via the local area network LAN. In the embodiment described here, this terminal TRM is a computer. Alternatively, the terminal TRM can be a phone, a tablet, a SmartWatch or any other object connected to the local area network LAN.

The gateway BX includes an interface iLAN allowing it to connect to the local area network LAN. The gateway BX also includes an interface iWAN allowing it to connect to the network NET, and more specifically to the access network NET1.

The gateway BX has two IP addresses: a first IP address assigned to its interface iLAN to communicate with equipment of the local area network LAN, and a second IP address assigned to its interface iWAN to communicate with equipment of the network NET.

In the embodiment described here, the device D of the network NET is a packet management device VoIP, this equipment is of the A-SBC/P-CSCF type. This equipment D can only check ranges of source IP addresses configured by and belonging to the operator of the network NET.

In accordance with the invention, it is desirable for the device D to detect, when it receives a packet from the gateway BX, whether this packet was generated by the gateway BX, or whether this packet was generated by the terminal TRM and transferred by the gateway BX.

The network NET includes an router RTR belonging to the networks NET2 and NET3 and allowing their connection. The network NET, and particularly the core network NET3, includes a service platform, P_SRV. The router RTR and the platform P_SRV can also constitute devices in accordance with the invention, implementing the traffic management method, in accordance with the invention.

FIG. 2 is a flowchart representing steps of a traffic differentiation method, in accordance with the invention, implemented by the gateway BX described with reference to FIG. 1. The flowchart of FIG. 2 also represents steps of a traffic management method, in accordance with the invention, implemented by the device D described with reference to FIG. 1.

Steps E200, E300, E400, F200, F300 and F400 described below are steps of the traffic differentiation method in accordance with the invention.

Steps E500, E600, E700, E800, F500, F600, F700 and F800 described below are steps of the traffic management method in accordance with the invention.

During a step E100, the terminal TRM sends to the gateway BX a packet P destined to a device accessible via the access network NET1. The device recipient of the packet can be a device of the network NET or a device reachable through the network NET.

It is assumed that the terminal TRM executes an automatic calling machine in Voice over IP, VoIP, fraudulently. In other words, the terminal TRM generates IP packets of VoIP calls destined to the network NET by preparing itself the SIP headers of these packets and by entering in the "user agent" field of these headers, the value that the SIP stack of the gateway BX inserts for the VoIP packets that it generates itself.

During a step E200, the gateway BX receives the packet P.

During a step E300, the gateway BX inserts in a field of the IP header of the packet P, marking information iMRK1 indicating that this packet P has been generated by a terminal of the local area network LAN.

If the packet P complies with the IPv4 standard, the field in which the marking information iMRK1 is inserted may be the "Flags" field. The marking information iMRK1 may consist of a bit "1" inserted in the first bit of the "Flags" field.

Alternatively, the gateway BX can insert the marking information iMKR1 in the "IP Option" field of the IPv4 header. In this case, a new option is created specifically to implement the invention and to be able to insert the marking information therein.

If the packet P complies with the IPv6 standard, the gateway BX can insert the marking information iMRK1 in the "flow label" field or in the "next header" field of the IPv6 header of the packet P.

If the packet P complies with the IPv6 standard, while the access network NET1 only supports the IPv4 standard, the gateway BX encapsulates the packet P complying with the IPv6 standard in a packet complying with the IPv4 standard. The gateway can insert the marking information in the IPv6 header of the transported packet P, or in the IPv4 header of the carrier packet or each of the IPv4 and IPv6 headers.

This also applies if the packet P complies with the IPv4 standard and if the access network NET1 only supports IPv6 packets.

During step E300, in addition to the insertion of the marking information iMRK1, the gateway BX can modify other fields of the header of the packet P in accordance with the state of the art, such as the "source IP address" or "source port" field if the packet P is an IPv4 packet, or the "Hop Limit" field if the packet P is an IPv6 packet, and the "cheksum" field for the packet P in IPv4. If the packet P is an IPv4 packet, the gateway BX updates its table NAPT in accordance with the state of the art.

During a step E400, the gateway BX routes the marked packet P (and possibly transported in another packet) to the access network NET1.

It is assumed that the marked packet P is conveyed to the device D, directly from the gateway, or via intermediate devices between the gateway and the device D.

During a step E500 of the traffic management method, the device D receives the packet P.

During a step E600, the device D searches in the header of the packet P whether a field of this header includes marking information identical to the marking information iMRK1.

Since the packet P includes marking information in its header, the result of the search E600 is positive.

During a step E700, the device D processes the packet P according to the positive result of the search.

In the case where the packet P does not include any marking information, the device D processes during a step E800 the packet P according to a negative result of the search.

It is assumed here that the processing E700 of the marked packet P includes storage of parameters of the IP session during which the packet P is received followed by a destruction of this packet P.

Thus, thanks to the storage of the parameters of the IP session, the device D can detect all the other possible packets generated by the fraudulent terminal TRM without having to search (E600) for marking information in their headers. The device D processes (E700) all the packets in this IP session in the same way, assuming they all include marking information iMRK1.

In this example, the device D destroys (E700) the packet P and all the packets of the same IP session as the packet P. The impact is that the fraud generated by the terminal TRM is therefore blocked at the device D; it is not transmitted to the devices located downstream of the device D, in particular the device recipient of the packet P.

In the embodiment described above, the gateway BX implements the differentiation method in accordance with the invention for all the packets it must transfer, without any consideration of the IP session, and without even storage of the parameters of their IP session(s).

In another embodiment, upon receipt E200 of the packet P, the gateway BX stores the parameters of the IP session of this packet P. Following this storage of the parameters of the IP session, the gateway does not insert marking information in other packets of the same IP session it receives from the terminal TRM, but it transfers them to the access network NET1 in accordance with the state of the art.

Alternatively, the gateway BX can store the parameters of the IP session of the packet P and apply the differentiation method in accordance with the invention for a determined number of packets of the same IP session. Thus, if the packet P does not reach the device D implementing the management method, at least another marked packet from the same IP session could be correctly conveyed to the device D.

During a step F200, the gateway BX generates a packet Q intended for a device of the network NET. In the embodiment described here, the packet Q is a signaling packet.

During a step F300, the gateway BX inserts in a field of the IP header of the packet Q, marking information iMRK2 indicating that this packet P has been generated by the gateway BX itself. The examples of fields in which the marking information iMRK1 can be inserted are also valid for inserting the marking information iMRK2 therein.

The gateway BX sends the packet Q including in its header the marking information iMRK2 to the access network NET1 during a step F400.

It is assumed that the device D receives this packet Q during a step F500.

During a step F600, identical to the search step E600, the device D searches in the header of the packet Q whether it includes the marking information iMRK1.

The result of this research (F600) being negative, the device D applies a processing during a step F800 according to this negative result. In the embodiment described here, this processing F800 consists of routing the packet Q to the device recipient of this packet Q.

Alternatively, if the result of the search F600 was positive, the device D processes the packet Q during a step F700 according to this positive result.

In one embodiment, the device D processes a packet received from the gateway BX according to three possibilities: if it finds the marking information iMRK1, or if it finds the marking information iMRK2, or if it can't find any marking information.

In one embodiment, the gateway BX inserts marking information (iMRK1) only for the packets generated by terminals of the local area network LAN connected thereto.

In another embodiment, the gateway BX inserts marking information (iMRK2) only for the packets it generates itself.

The traffic management method in accordance with the invention can also be implemented by the router RTR and/or by the platform P_SRV.

FIG. 3 illustrates architecture of a local area network LAN connected via a gateway Tcx to a network NET of an operator. This architecture allows implementing differentiation and management methods in accordance with a second embodiment of the invention.

In this embodiment, the local area network LAN is a WiFi network. The network NET is a cellular network, of the 4G type for example. The network NET includes an access network NET1, a metropolitan area network NET2, and a core network NET3. The local area network LAN constitutes a first network within the meaning of the invention. The access network NET1 constitutes a second network within the meaning of the invention.

A terminal TRM is connected to the gateway Tcx via the local area network LAN. The gateway Tcx is a terminal connected both to the local area network LAN (WiFi) and to the access network NET1 (4G). This gateway Tcx offers a Tethering service to allow the terminal TRM to benefit from its connection to the cellular access network NET1.

In the embodiment described here, the access network NET1 includes an antenna ANT of the eNodeB or advanced eNodeB type. This antenna ANT constitutes a gateway between the access network NET1 and the metropolitan area network NET2.

In this embodiment, the core network NET3 includes an MME (Mobility Management Entity) type device and an SGW (Serving GateWay) type device. The core network NET3 is connected to the Internet network via a device PGW1 of the PGW (Packet Gate Way) type, and to an extranet network via a device PGW2 of the PGW type as well. A service platform P-SRV is connected to the Internet network. A terminal DEST is connected to the extranet network, particularly this terminal DEST can be a recipient of a packet generated by the terminal TRM of the local area network LAN.

To avoid fraud in the connection of the terminals to the gateway Tcx without being authorized by a user of the gateway Tcx, the gateway Tcx implements the traffic differentiation method, in accordance with the invention. The gateway Tcx therefore inserts in fields of the IP headers of the packets it emits to the access network NET1, marking information to differentiate whether these packets are generated by the terminal TRM or by itself (Tcx).

The base station ANT implements the management method in accordance with the invention to manage the traffic it receives from the gateway Tcx according to results of search for marking information in IP packets of this traffic. The base station ANT constitutes a device in accordance with the invention.

Also, the base station ANT can implement the differentiation method in accordance with the invention, to differentiate whether a packet it emits to a device of the network NET (for example the MME device or a router) was generated by itself (ANT) or was generated by a terminal Tcx connected thereto via the access network NET1. In this case, the access network NET1 constitutes a first network within the meaning of the invention, and the network aggregation NET2 constitutes a second network within the meaning of the invention.

Each of the devices MME, SGW, PGW1, PGW2, P_SRV and DEST can constitute a device in accordance with the invention and implement the traffic management method in accordance with the invention.

Particularly, the flowchart of FIG. 2 can be applied in the networks of FIG. 3.

FIG. 4 represents functional architectures, according to one embodiment of the invention, of a traffic management system SYS, of a gateway BX (or Tcx) and of a traffic management device D (or RTR, ANT, MME, SGW, PGW, PGW1, PGW2, P_SRV, DEST), the system SYS, the gateway BX and the device D being all in accordance with the invention.

The system SYS includes the gateway BX and the device D.

The gateway BX is a gateway between a local area network LAN and an access network NET1 as described with reference to the preceding FIGS. 1 to 3. The gateway BX includes:

- a traffic differentiation module MRK configured to insert marking information (iMRK1, iMRK2) in a field of the header of a packet (P, Q) emitted by this gateway and intended to be routed to the access network NET1 to differentiate whether:
  - the packet (P) was generated by the gateway BX; or whether
  - the packet (Q) was generated by a terminal TRM of the local area network LAN and which is connected thereto; and
- communication means COM configured to send the packet (P, Q) to the access network NET1.

The gateway BX can be comprised in:

- a terminal able to provide a connection sharing service of the Tethering type, such as the terminal Tcx described with reference to FIG. 3;
- network termination equipment, such as the equipment BX described with reference to FIGS. 1 and 2; or
- an antenna of a cellular network, such as the base station ANT described with reference to FIG. 3.

The device D is a device of a network NET including an access network NET1, such networks are described with reference to the preceding FIGS. 1 to 3. The device D is connected to the gateway BX via the access network NET1. It allows managing a traffic received from this gateway and it includes:

- communication means COM configured to receive a packet (P, Q) from the gateway BX;
- search means DTC configured to search for at least one marking information (iMRK1, iMRK2) in a field of the header of the packet (P, Q), this marking information allowing differentiating whether:
  - the packet (Q) was generated by the gateway, or whether
  - the packet (P) was generated by a terminal TRM of the local area network LAN connected to the gateway BX; and
- a processing module PROC configured to process the packet (P, Q) based on the result of the search.

The device D in accordance with the invention can be comprised in:

- a device recipient of the packet, such as the device DEST described with reference to FIG. 3;
- a network termination equipment;
- an access point of a cellular access network, such as the base station ANT described with reference to FIG. 3;
- a router RTR;
- a switch;
- a traffic load manager;
- a Firewall-type server;
- an A-SBC, P-CSCF, MME, PGW, or SGW type device; or
- a platform for providing a service, such as the platform P_SRV described with reference to FIGS. 1 and 3.

In the embodiments described here, the gateway BX (or Tcx) has the hardware architecture of a computer, as illustrated in FIG. 5.

The architecture of the gateway BX (or Tcx) comprises in particular a processor 7, a random access memory 8, a read-only memory 9, a non-volatile flash memory 10 in a particular embodiment of the invention, as well as communication means 11. Such means are known per se and are not described in more detail here.

The read-only memory 9 of the gateway BX (or Tcx) according to the invention constitutes a recording medium in accordance with the invention, readable by the processor 7 and on which a computer program ProgTx in accordance with invention is recorded here.

The memory 10 of the gateway BX (or Tcx) allows recording variables used for the execution of the steps of the differentiation method according to the invention, such as the packets P and Q and the marking information iMRK1 and iMRK2.

The computer program ProgTx defines functional and software modules here, configured to differentiate a traffic emitted by the gateway BX (or Tcx). These functional modules are based on and/or control the hardware elements 7-11 of the gateway BX (or Tcx) mentioned above.

In the embodiment described here, the traffic management device D (or RTR, ANT, MME, SGW, PGW, PGW1, PGW2, P_SRV, DEST) has the hardware architecture of a computer, as illustrated in FIG. 6.

The architecture of the device D comprises in particular a processor 7, a random access memory 8, a read-only memory 9, a non-volatile flash memory 10 in one particular embodiment of the invention, as well as communication means 11. Such means are known per se and are not described in more detail here.

The read-only memory 9 of the device D according to the invention constitutes a recording medium in accordance with the invention, readable by the processor 7 and on which a computer program ProgRx in accordance with the invention is recorded here.

The memory 10 of the device D allows recording variables used for the execution of the steps of the management method according to the invention, such as the packets P and Q and the marking information iMRK1 and iMRK2.

The computer program ProgRx defines functional and software modules here, configured to manage a traffic emitted by the gateway BX (Tcx). These functional modules are based on and/or control the hardware elements 7-11 of the device D mentioned above.

The invention claimed is:

1. A traffic differentiation method implemented by a gateway between a first network and a second network, said method comprising:

inserting, by the gateway, marking information in a field of the header of a packet emitted by said gateway and intended to be routed to said second network, the marking information allowing a recipient device of a network including the second network to determine whether:

said packet was generated by said gateway, or whether said packet was generated by a terminal of said first network connected to said gateway, received by the gateway from the terminal, and, after the reception of said packet by said gateway, modified by said gateway to include said marking information, wherein inserting the marking information comprises inserting one of a first marking information and of a second information in a field of the header of the packet, the first marking information being inserted when the packet is generated by the gateway itself and the second information being inserted when the packet is received from a terminal of the first network and transferred to the second network; and sending said packet comprising said marking information to said second network, the first network and the second network being two different types of networks using different protocols.

2. The method of claim 1 wherein:

the first network is a local area network and the second network is an access network; or the first network is an access network and the second network is an aggregation network or a core network.

3. The method of claim 1 wherein said packet is of the IPv4 type, said field being the “Flags” field or the “IP options” field of an IPv4 header.

4. The method of claim 1 wherein said packet is of the IPv6 type, said field being the “flow label” or “extension header” type field of an IPv6 header.

5. The method of claim 1, wherein the method is implemented without any consideration of an IP session, and without storage of any parameters of an IP session.

6. The method of claim 1, wherein the marking information comprises a single bit.

7. A method for managing a traffic received by a recipient device of a network including a second network, the traffic being received from a gateway between a first network and said second network, said recipient device being connected to said gateway via said second network, said method comprising:

receiving a packet from said gateway;

searching for marking information inserted by said gateway in a field of the header of said packet, said marking information allowing the recipient device to determine whether:

said packet was generated by said gateway, or whether said packet was generated by a terminal of said first network connected to said gateway, received by the gateway from the terminal, and, after the reception of said packet by said gateway, said packet was modified by said gateway to include said marking information, wherein the marking information comprises one of a first marking information and of a second information in a field of the header of the packet, the first marking information having been inserted when the packet was generated by the gateway itself and the second information having been inserted when the packet was received from a terminal of the first network and transferred to the second network; and processing said packet based on the result of said searching, the first network and the second network being two different types of networks using different protocols.

8. The method of claim 7, wherein said processing of said packet includes at least one selected from a group comprising:

an incrementation of a packet counter including marking information;

a deletion or modification of said marking information before transfer of said packet to another device;

a selection of a quality of service to be applied to said packet;

an application to said packet of a routing method;

a destruction of said packet;

a sending of an ICMP packet to the sender of the processed packet;

a creation of an IP tunnel to route said packet via said tunnel;

a de-capsulation of a tunnel IP via which said packet is routed; and a storage of parameters of the session during which said packet is received, to apply a processing to other packets of the same session.

9. A non-transitory computer readable medium having stored thereon instructions which, when executed by a processor, cause the processor to implement a method for managing a traffic received by a recipient device of a network including a second network, the traffic being received from a gateway between a first network and said second network, said device being connected to said gateway via said second network, said method comprising:

receiving a packet from said gateway;

searching for marking information inserted by said gateway in a field of the header of said packet, said marking information allowing the recipient device to determine whether:

said packet was generated by said gateway, or whether said packet was generated by a terminal of said first network connected to said gateway, received by the gateway from the terminal, and, after the reception of said packet by said gateway, said packet was modified by said gateway to include said marking information, wherein the marking information comprises one of a first marking information and of a second information in a field of the header of the packet, the first marking information having been inserted when the packet was generated by the gateway itself and the second information having been inserted when the packet was received from a terminal of the first network and transferred to the second network; and processing said packet based on the result of said searching, the first network and the second network being two different types of networks using different protocols.

10. A non-transitory computer readable medium having stored thereon instructions which, when executed by a processor, cause the processor to implement a traffic differentiation method implemented by a gateway between a first network and a second network, said traffic differentiation method comprising:

inserting, by the gateway, marking information in a field of the header of a packet emitted by said gateway and intended to be routed to said second network, the marking information allowing a recipient device of a network including the second network to determine whether:

said packet was generated by said gateway, or whether said packet was generated by a terminal of said first network connected to said gateway and modified by said gateway to include said marking information, wherein inserting the marking information comprises inserting one of a first marking information and of a second information in a field of the header of the packet, the first marking information being inserted when the packet is generated by the gateway itself and the second information being inserted when the packet is received from a terminal of the first network and transferred to the second network; and sending said packet comprising said marking information to said second network, the first network and the second network being two different types of networks using different protocols.

11. A gateway between a first network and a second network, the gateway comprising a processor, the gateway configured to:

insert marking information in a field of the header of a packet emitted by said gateway and intended to be routed to said second network, the marking information allowing a recipient device of a network including the second network to determine whether:

said packet was generated by said gateway; or whether said packet was generated by a terminal of said first network connected to said gateway, received by the gateway from the terminal, and, after the reception of said packet by said gateway, modified by said gateway to include said marking information, wherein inserting the marking information comprises inserting one of a first marking information and of a second information in a field of the header of the packet, the first marking information being inserted when the packet is generated by the gateway itself and the second information being inserted when the packet is received from a terminal of the first network and transferred to the second network; and send said packet comprising said marking information to said second access network, the first network and the second network being two different types of networks using different protocols.

12. The gateway of claim 11, wherein the gateway forms a part of:

a terminal able to provide a connection sharing service of a Tethering type;

a network termination equipment; or a base station of a cellular network.

13. A recipient device of a network including a second network, said recipient device being connected to a gateway between a first network and said second network, and allowing managing a traffic received from said gateway, said recipient device comprising a processor, said recipient device configured to:

receive a packet from said gateway;

search for at least one marking information, inserted by the gateway in a field of the header of said packet, said marking information allowing said recipient device to determine whether:

said packet was generated by said gateway, or whether said packet was generated by a terminal of said first network connected to said gateway, received by the gateway from the terminal, and, after the reception of said packet by said gateway, modified by said gateway to include said marking information, wherein the marking information comprises one of a first marking information and of a second information in a field of the header of the packet, the first marking information having been inserted when the packet was generated by the gateway itself and the second information having been inserted when the packet was received from a terminal of the first network and transferred to the second network; and process said packet based on the result of the searching, the first network and the second network being two different types of networks using different protocols.

14. The device of claim 13, wherein the device forms a part of:

a device recipient of said packet;

network termination equipment;

an access point of a cellular access network;

a router;

a switch;

a traffic load manager;

a Firewall-type server;

an A-SBC, P-CSCF, MME, PGW, or SGW type device; or a platform for providing a service.

15. A system for managing a traffic emitted by the gateway of claim 11 to said second network, said system including said gateway and at least one management device comprising a processor, said at least one management device configured to:

receive a packet from said gateway;

search for at least one marking information, inserted by said gateway in a field of the header of said packet, said marking information allowing said management device to determine whether:

said packet was generated by said gateway, or whether said packet was generated by a terminal of said first network connected to said gateway and modified by said gateway to include said marking information; and process said packet based on the result of the search, the first network and the second network being two different types of networks using different protocols.

* * * * *